(12) United States Patent
Spencer et al.

(10) Patent No.: US 6,337,098 B1
(45) Date of Patent: Jan. 8, 2002

(54) METHOD OF IMPROVING THE AROMA AND FLAVOR OF COFFEE USING NOBLE GASES

(75) Inventors: Kevin C. Spencer, Hinsdale; Christine E. Boisrobert, Chicago, both of IL (US)

(73) Assignee: American Air Liquide, Walnut Creek, CA (US)

(*) Notice: Subject to any disclaimer, the term of this patent is extended or adjusted under 35 U.S.C. 154(b) by 0 days.

(21) Appl. No.: 08/305,733

(22) Filed: Sep. 14, 1994

Related U.S. Application Data (63) Continuation of application No. 08/151,053, filed on Nov. 12, 1993, now abandoned, which is a continuation of application No. 07/982,466, filed on Nov. 27, 1992, now abandoned, which is a continuation-in-part of application No. 07/862,727, filed on Apr. 3, 1992, now abandoned.

(51) Int. Cl.⁷ .................................................. A23F 5/00
(52) U.S. Cl. ........................ 426/312; 426/316; 426/594
(58) Field of Search ................................ 426/312, 316, 426/594

(56) References Cited

U.S. PATENT DOCUMENTS 3,677,024 A * 7/1972 Segall .................... 426/524 X \* cited by examiner

*Primary Examiner*—Anthony J. Weier
(74) *Attorney, Agent, or Firm*—Oblon, Spivak, McClelland, Maier & Neustadt, P.C.

(57) ABSTRACT

A method of improving the aroma and flavor of coffee, which entails contacting the same with a noble gas, mixture of noble gases or mixture containing at least one noble gas during at least a portion of any stage of processing or storage.

40 Claims, 6 Drawing Sheets

METHOD OF IMPROVING THE AROMA AND FLAVOR OF COFFEE USING NOBLE GASES

This application is a continuation of application Ser. No. 08/151,053, filed on Nov. 12, 1993, now abandoned, which is a Continuation of Ser. No. 07/982,466 filed Nov. 27, 1992, abandoned, which is a Continuation-in-Part of Ser. No. 07/862,727, abandoned.

BACKGROUND OF THE INVENTION

1. Field of the Invention

The present invention relates to a method of improving the aroma and flavor of coffee using noble gases.

2. Description of the Background

Coffee is cultivated in many tropical countries and the beans afford a soothing drink which may be both relaxing and stimulating. Coffee beans generally constitute about 1–2% caffeine, 10–15% coffee oil, 8% of sugars, such as sucrose, 11% proteins, 5% ash and 6% chlorogenic and caffeic acid. Other constituents include cellulose, hemicelluloses, trigonelline, tannic acid and volatile oils. *Merck Index* (11th edition).

Coffee processing involves the various following steps, some of them being optional:

picking of green coffee beans, their packaging in hemp bags, transport, blending cleaning roasting stoning/cleaning grinding (optional)

packaging of roast beans or ground roast coffee (optional)

preparation of dried instant coffee from ground roast (optional)

packaging of dried instant coffee (optional)

The freshness of coffee is known to be compromised by several factors, including the escape of volatiles and oxygen-induced polymerization of flavor constituents.

Coffee is currently packaged under nitrogen or under vacuum in order to protect its components from contact with oxygen. The coffee roasting and grinding process is described in Sivetz and Desrosier, *Physical and Chemical Aspects of Coffee* (AVI Publishing Company, Inc.) (1979), and involves essentially batch or onstream roasting, followed by grinding, followed by storage. At every stage, it is possible to impose an inert atmosphere to protect the coffee, but generally, this is done only upon packaging and storage.

For example, CH 573848 describes the inerting activity of nitrogen in preparation of packaged coffee.

WO 8600503, DE 3425088, AU 8546026, EP 189442 and DE 3448380 each discloses the use of gas in the heating of coffee products to prevent the loss of aroma and prevent boiling, wherein nitrogen and or noble gases are considered equivalent.

FR 2225095 describes packaging of roasted coffee under a gas atmosphere wherein the coffee is degassed with an inert gas for 12 to 48 hours, then impermeable packets are filled with the roasted coffee, a 50–90% partial vacuum is drawn, followed by injection of a preservative gas, where either argon or nitrogen are used, with no different effect reported (nitrogen and argon are used with equivalence).

In fact, changes in the chemical composition of coffee headspace caused by oxidation are one of the main factors responsible for quality loss in coffee as either roasted beans or grounds. Exposure of coffee to air causes rapid staling. Staleness caused by oxidation can be detected by simple tasting, when compared to a freshly ground coffee. Staling of coffee grounds is five to ten times faster than that of coffee beans. See *Food Chemistry*, 36:135–148, Kallio et al.

Coffee aroma and flavor are of complex and unstable composition. Over 700 compounds have been reported and identified as coffee headspace volatiles. A typical gas chromatogram of the headspace from brewed coffee is given by Shimoda et al., *J. Agric. Food. Chem.*, 38:802–804, 1990. Sixty-two compounds were found and identified. These are aldehydes, ketones, esters, pyrazines, mercaptans, sulfides, disulfides, thiophenes, and thiazoles. The major coffee volatile was 2-methylbutanal (GC area %=17.7).

Studies using gas chromatography and mass spectrometry show that about 50% aldehydes, 20% ketones, 8% esters, 7% heterocyclic, 2% dimethyl sulfide, and lesser amounts of other organic and odorous sulfides constitute the body of coffee aroma volatiles. Contributing to a lesser extent to the coffee aroma are also nitriles, alcohols, low molecular weight saturated and unsaturated hydrocarbons, furans, furfurals, and acetic acid. Particularly important in defining the coffee aroma are acetaldehyde, diacetyl, and dimethyl sulfide; the latter being defined as an exhilarating constituent of the coffee aroma.

An example of a coffee headspace chromatogram in an air atmosphere is given by Kallio et al, 1990. Thirty-eight compounds were found and identified. Oxidation in air-packaged coffee can be traced by the disappearance of carbon disulfide, dimethyl sulfide and dimethyl disulfide peaks. The oxidation of the strong aromatic constituent dimethyl sulfide to the nonvolatile and odorless methyl sulfoxide is one of the main contributors to coffee flavor deterioration. Methyl sulfoxide can also undergo further oxidation. Aldehydes, which constitute the bulk of coffee volatiles, are also readily susceptible to oxidation. Ratios of volatiles are also useful indicators of deterioration due to oxidation. For example, the ratio of 2-methylfuran/2-butanone (M/B), one of the coffee aroma indexes (Kallio et al., 1990), decreases in the presence of air due to oxidation, as demonstrated by GC/MS headspace analysis.

Oxidation can also lead to certain chemical reactions between coffee solubles and coffee volatiles. Moisture in air also contributes to the deteriorating effect of oxygen on coffee flavor.

Roast coffee beans and grounds are currently packaged or otherwise stored in air-tight containers under vacuum or a protective inert atmosphere to prevent oxidation. However, these methods are not completely effective, and address only oxidations driven by the presence of atmospheric oxygen. Further, nitrogen does not completely displace oxygen, and vacuum packaging removes a portion of the desirable flavor components.

Hence, a need exists for a method by which both the aroma and flavor of coffee may be improved during either production or storage or both.

SUMMARY OF THE INVENTION

It is an object of the present invention to provide a method of improving the aroma and/or the flavor of coffee by direct chemical control.

It is an object of the present invention to provide a method of improving the aroma and/or the flavor of coffee using certain noble gases.

It is a further object of the present invention to improve the shelf life of said coffee.

DETAILED DESCRIPTION OF THE PREFERRED EMBODIMENTS

The above objects and others which will become more apparent in view of the following disclosures are provided by a method of improving the aroma and/or the flavor of coffee, comprising injecting a gas or a gas mixture into coffee in a closed space and/or into the closed space, the gas or gas mixture containing an element selected from the group consisting of argon, krypton, xenon and neon and an mixture thereof, substantially saturating the coffee with the gas or gas mixture, maintaining said saturation substantially throughout the volume of the closed space and during substantially all the time that said coffee is present in said closed space.

It has been unexpectedly discovered that if instead of blanketing the space above a coffee stored or processed in a container or a closed space with any kind of inert gas, a gas selected from the group consisting of argon, krypton, xenon and neon or a mixture thereof is sparged into the coffee (around the beans or into the powder made of ground coffee or instant coffee) and/or injected above the coffee in order to saturate or substantially saturate said coffee with said gas or gas mixture, it is possible to substantially improve the flavor and/or the aroma and/or the shelf life of said coffee, particularly when said saturation or substantial saturation is maintained throughout the volume of the closed space and during substantially all the time that the said coffee is stored in said container.

The term "substantially saturate" means that it is not necessary to completely and/or constantly saturate the coffee with said gas or gas mixture (i.e., having the maximum amount of gas solubilized in said coffee). Usually, it is considered necessary to saturate said coffee to more than 50% of its (full) saturation level and preferably more than 70%, while 80% or more is considered the most adequate level of saturation of the coffee. Of course, supersaturation is also possible. This means that if during the storage life of the coffee in the container, the coffee is not saturated with noble gas at least from time to time or even quite longer if it remains generally substantially saturated, results according to the invention are usually obtained. While it is important that the entire volume of the container be saturated or substantially saturated with one of the above gas or a mixture thereof, it is quite possible to obtain the results according to the invention if a part of the volume is not saturated during preferably a limited period of time or is less saturated or substantially saturated than other portions of the volume of the coffee in the container.

While at least one of the above gases must be present in order to obtain the benefits of the invention, said gases can be diluted with some other gases, in order to keep for example the invention economically valuable. Said diluent gases are preferably selected from the group comprising nitrogen, oxygen, nitrous oxide, air, helium or carbon dioxide. In case of an oxygen-containing gas or another reactive gas such as carbon dioxide, their degradative properties are such that these properties will mask the effect of noble gases, certainly in mixtures where they comprise 50% vol. or more and possibly 30% vol. or more. When those mixes comprise 0% to 10% vol. of these other gases, the noble gases referred to above are still extremely effective, while between 10% vol. and 20% vol. they are usually still effective, depending on the type of gases and conditions, which might be easily determined by the man skilled in the art.

In case of nitrogen and/or helium gas, the effect of noble gases consisting of Ar, Ne, Kr, Xe in the mixture is linearly proportional to its concentration in the mixture, which evidences that nitrogen and/or helium have no effect on substantially preventing oxidation of coffee. The mixture of noble gas and nitrogen and/or helium can thus comprise any amount (% volume) of nitrogen and/or helium: however, in practice, the lesser the proportion of noble gas selected from the group consisting of Ar, Ne, Kr and Xe, the larger the time required to achieve saturation or substantial saturation of the coffee.

Among the active gases (Ar, Kr, Xe, and Ne), it is preferred to use argon because it is less expensive than the other active gases. However, mixtures of argon and/or krypton and/or xenon are at least as effective as argon alone. It has also been unexpectedly found that mixtures comprising between 90 to 99% vol. argon and 1 to 10% Xe and/or Kr are usually the most effective as exemplified in the further examples (whether or not they are diluted with nitrogen, helium, or nitrous oxide). The difference in effect between the active gases defined hereabove and nitrogen have been also evidenced by the fact that mixtures of argon and oxygen or carbon dioxide have a similar (while decreased) effect than argon alone, while nitrogen mixed with oxygen or carbon dioxide evidenced no protective or preservative effect compared to oxygen or carbon dioxide alone.

It is believed that the saturation or substantial saturation of the coffee is an essential feature of the invention and that no one in the prior art has ever disclosed nor suggested said feature.

Generally speaking, Xe is the most efficient gas according to the invention, followed by Kr, Ar and Ne. Among the suitable mixes, either pure or diluted with $N_2$, He, $N_2O$ (or even air, oxygen or a small amount of hydrogen) are the Ne/He mix comprising about 50% vol. of each, and the Kr/Xe mix comprising about 5–10% vol. Xe and about 90–95% vol. Kr, with a small amount of argon and/or oxygen (less than 2% vol.) or nitrogen (less than 1% vol.).

The temperatures at which the invention is carried out is between about 0° C. to about 600° C. Ok more. Preferably for some processing steps, like roasting, a temperature from about 200° C. to about 600° C. is usually used, while for most processing and storage steps, a temperature between about 20° C. and about 40° C. It is also possible to introduce the gas or gas mixture as a cryogenic liquid, which is either vaporized and heated before using it or used as such to freeze the coffee (beans or ground).

The injection of the gas or gas mixture into the coffee and/or into the storage container, e.g. by sparging is usually done at about 1 atmosphere but is still quite operable at 2 or 3 atmospheres, while saturation is increased at higher pressures. The pressure of the gas above the coffee in the storage container shall be, in any case, preferably lower than 3 atmospheres and it is usually acceptable to maintain it lower than 2 atmospheres. A slight overpressure (between 1 or 2 atmospheres) is usually sufficient.

However, the gases or gas mixes according to the invention may still be entirely effective below atmospheric pressure, provided that such gas can saturate or substantially saturate the coffee, the effect of said gas or gases or gas mixes being a fraction of its effect at 1 atmosphere. In case of processing coffee, a higher pressure may be used up to 100 atmosphere but usually less than 10 atmosphere and preferably between 1 and 6 atmosphere.

In the roasting step, heat is delivered efficiently by means of introduction of hot inert gas (nitrogen, carbon dioxide, and/or water vapor, although occasionally air is used) into a batch or continuous flow through process roaster. In the batch process, heat is delivered at temperatures of approximately 480–540° C. for 11–12 min., wherein 430,000 BTU is ordinarily used for 1200 lb. (545 kg) of beans. In the flow-through continuous process, temperatures of 260° C. are used for 5–8 min. The hot gases are usually recycled in order to conserve energy costs. Many variations in roasting procedures are used, primarily to control energy costs or to control thermal decomposition of the product, or to achieve commercially important variations in the product.

Argon, krypton, xenon and neon are usually not preferred in the roasting process because of their high cost and poor heat capacity. We have found that roasting under noble gas, preferably argon, improves the flavor and aroma and inhibits undesirable oxidative reactions which affect the final product. This improvement is noted even in the presence of nitrogen, carbon dioxide, or air when present below a certain percentage. Usually pure argon is excellent, adding Xe, Kr or Ne improves the result, adding nitrogen diminishes the result as a direct dilution of argon, and adding a reactive gas such as air, oxygen, carbon dioxide or nitrous oxide strongly diminishes the result by stimulating oxidation. However, argon admixed with these reactive gases at levels of 90+% preferably, or above 80% adequately, and under 70% only possibly, is markedly superior to gas mixtures made similarly using nitrogen.

In the stoning step, air-lifts are used to separate the roasted beans from heavier contaminants. Using argon, or because of cost considerations, mixtures of argon with nitrogen (preferably 10:90% argon:nitrogen), inhibits oxidation and rancidity (staling) in the roasted beans.

In the grinding step, a plate or compactor, and/or a roll of granulator grinder are used to crush beans into small particles which may then be either packaged for sale or extracted for dried instant coffee production. During grinding, we have found that a great improvement in the oxidative stability (inhibition of oxidative reactions) and concomitant improvement in aroma and flavor characteristics of the final coffee products is conferred through the use of noble gases, preferably argon. Specifically, grinding under cryogenic argon (or because of cost considerations, mixtures with cryogenic nitrogen to 10:90% ar:$N_2$), is a marked improvement, although gases may be applied under the same considerations as above for roasting step.

In the packaging step, ground roast coffee has been usually packaged in cans or heavyweight metallicized foil packages with an initial vacuum of 28 ins Hg abs (94.8 kilopascals absolute pressure) or better. Lightweight foil packages generally permit only poorer vacuums. Coffee may also be packaged under inert gas, specifically carbon dioxide or nitrogen. We have found that packaging of either ground roast coffee or dried instant under conditions where noble gas, preferably argon, saturates or substantially saturates the product, results in a much improved final product wherein oxidative reactions are inhibited and aroma and flavor are improved, even in the presence of small amounts of oxygen.

To the degree practicable, the drying process for production of dried instant coffee can be improved by introduction of noble gas, preferably argon, before and after the evacuation process. In the case of freeze drying, optimal results are had by freezing the coffee under cryogenic argon, or to limit costs, admixtures of argon with nitrogen to 10:90% as above.

In every case, the optimal method is to saturate or substantially saturate the product with noble gas selected from the group defined hereabove as completely as possible.

There are a variety of standard methods available for the detection, qualitative and quantitative measurement of gases, and several are especially well suited for the determination of degree of saturation of noble gases into solid samples.

Samples generally are completely evacuated as a control for zero % saturation. Such samples may then be completely saturated by contact with noble gases such that no additional noble gas will disappear from a reservoir in contact with the sample. Such saturated samples may then have their gas content driven off by trapped evacuation or by increase in temperature, and said gas sample identified quantitatively and qualitatively. Analysis is of trapped gases, reservoir gases, or some other headspace of gases, not directly of the sample.

Direct sample analysis methods are available, and include comprehensive GC/MS analysis, or by mass or thermal conductance or GC analysis and comparison with calibrated standards.

The simplest method is GC/MS (gas chromatography/mass spectrometry), which directly determines gas compositions. By preparing a standard absorption curve into a given sample for a series of gases and mixtures, one can accurately determine the degree of saturation at any point in time.

GC/MS is applied to the gas itself, as in the headspace above a sample. The technique may be used either to determine the composition and quantity of gas or mixture being released from a sample, or conversely the composition and quantity of a gas or mixture being absorbed by a sample by following the disappearance of the gas.

Appropriate GC/MS methods include, for example, the use of a 5 Angstrom porous layer open tubular molecular sieve capillary glass column of 0.32 mm diameter and 25 meter length to achieve separation, isothermally e.g. at 75° C. or with any of several temperature ramping programs optimized for a given gas or mixture e.g. from 35–250° C., wherein ultra-high purity helium or hydrogen carrier gas is used at e.g. 1.0 cc/min flow rate, and gases are detected based upon their ionicity and quantitative presence in the sample, and characterized by their unique mass spectra.

Appropriate experimental conditions might include, for example, completely evacuating a given sample under vacuum to remove all absorbed and dissolved gases, then adding a gas or mixture to the sample and measuring a) the rate of uptake of each component as disappearance from the added gas, and/or b) the final composition of the gas headspace after equilibration. Both measurements are made by GC/MS, and either method can be used in both batch and continuous modes of operation.

A simplification of this analysis entails the use of a GC only, with a thermal conductivity detector, wherein adequate knowledge of the gas saturation process and preparation of calibration curves have been made such that quantification and characterization of gases and mixtures can be accomplished without mass spectral analysis. Such instruments are relatively inexpensive and portable.

A further simplification would depend solely upon measurement of the mass change in the sample upon uptake of various gases or mixtures, which depends upon the use of standard curves or absorption data available from the literature.

An alternate method for such mass measurements is thermogravimetric analysis, which is highly precise, wherein a sample is saturated with gas and mass changes are correlated to thermal change.

DETAILED DESCRIPTION OF THE PREFERRED EMBODIMENTS

GC/MS headspace analysis of coffee samples packaged in pouches (up to 1 kg) or in vials (1 g–125 g) under vacuum or under a gas or gas mixture were conducted over a period of 2 years. Samples were prepared by grinding fresh roasted coffee beans in air or in any of the test gases or by grinding under cryogenic liquified gas. Test gases constituted air, oxygen, nitrogen, argon, xenon, krypton, neon, helium, carbon dioxide, nitrous oxide, and decile binary and ternary combinations of these. A large variety of commercial coffees was so tested. Further tests were conducted using ground coffees packaged and available commercially, wherein the atmosphere or package was tested then exchanged for a period of time.

It was found that nitrogen displacement of oxygen or vacuum packaging naturally retarded the oxidation of coffee by atmospheric nitrogen. However, it was surprisingly found that the noble gases according to the inention preserved the flavor and aroma components better, and inhibited oxidation dramatically better than did nitrogen, carbon dioxide or vacuum packaging. Also, carbon dioxide and nitrous oxide had some deleterious effects upon flavor and accelerated some oxidation processes. Helium has no effect different from nitrogen.

The improvement effected by the noble gases was not due only to their increased solubility, nor only to their increased ability to desorb water. These gases were found to possess unique properties which actually interfere with ongoing oxidation processes at the molecular level.

Specifically, it was found for each of the coffees tested that noble gases retarded oxidation of aldehydes, sulfides, and other oxidizable components such that shelf life can be extended by at least 30% and up to two times that of nitrogen-packaged or vacuum-packaged coffee. More importantly, the coffee aroma, flavor and fragrance parameters most important to consumers are better preserved in the same degree.

For example, the rate of decrease in the ratio of 2-methylfuran to 2-butanone (M/B ratio) was retarded by 30% over the test period.

Figure 1:
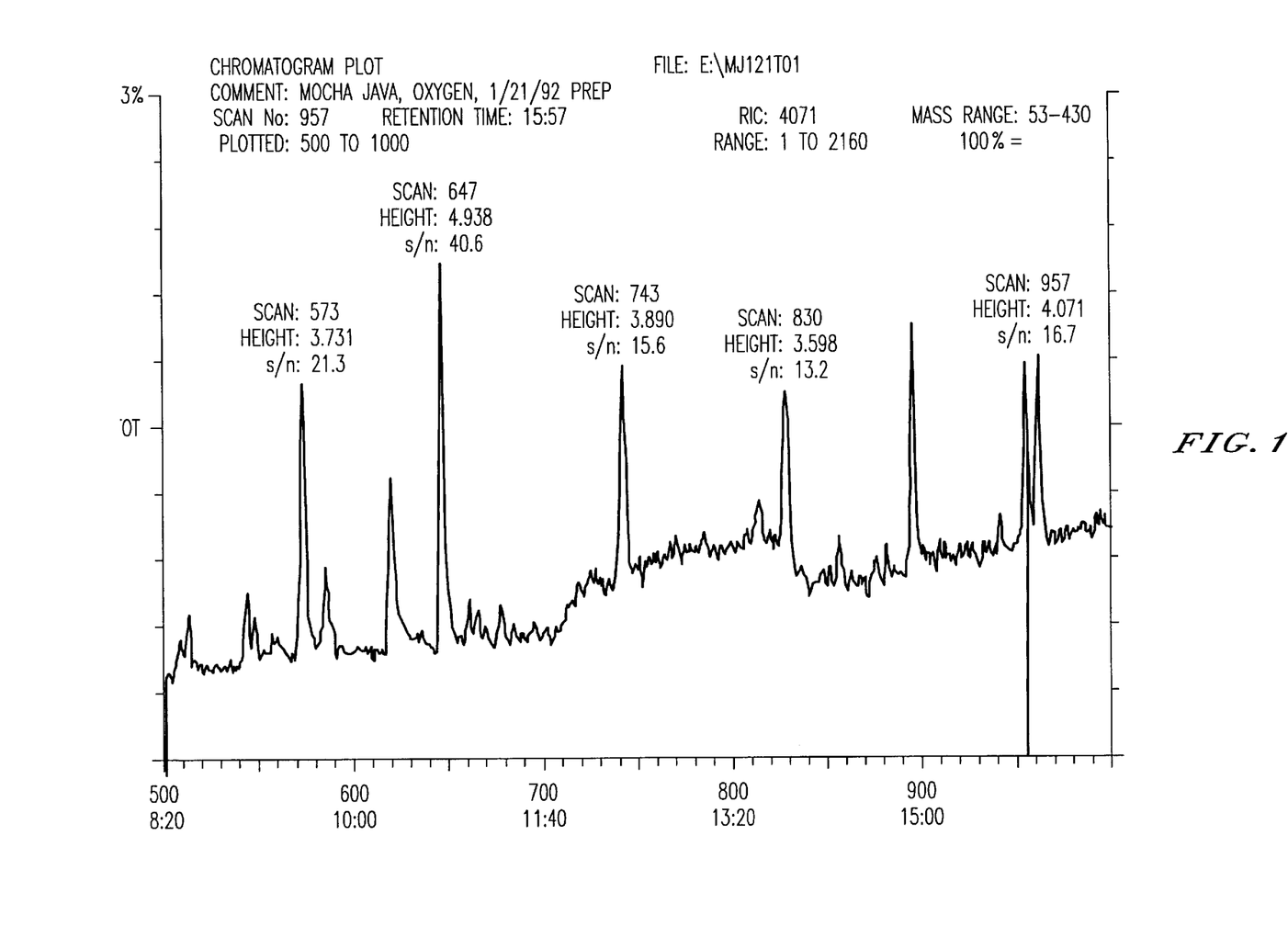
FIG. 1 illustrates a GC/MS of mocajava aroma constituents. The coffee was fresh ground in nitrogen and packaged under oxgyen.
Figure 2:
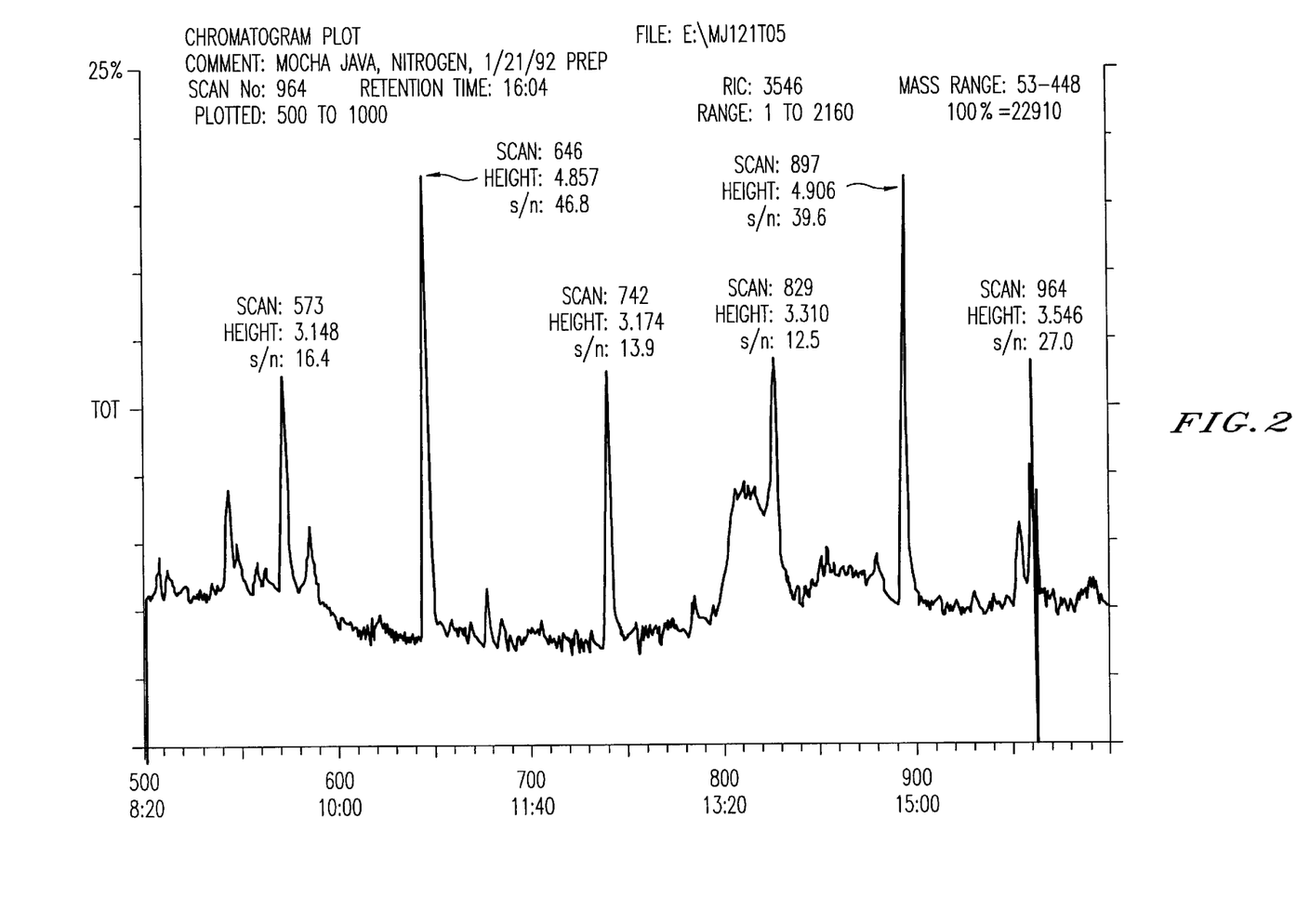
FIG. 2 illustrates Mocha Java packaged under nitrogen.
Figure 3:
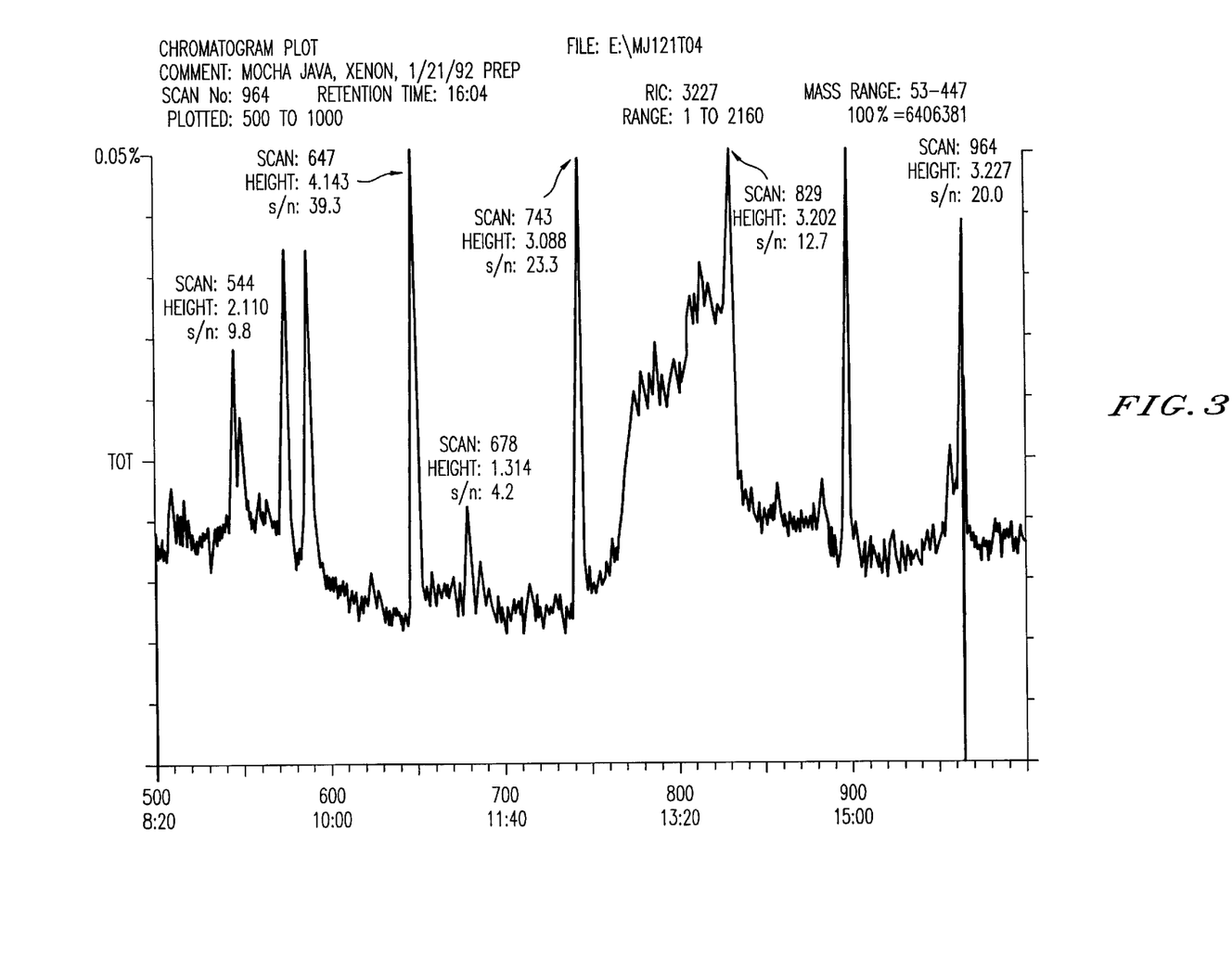
FIG. 3 illustrates Mocha Java under xenon
Figure 4:
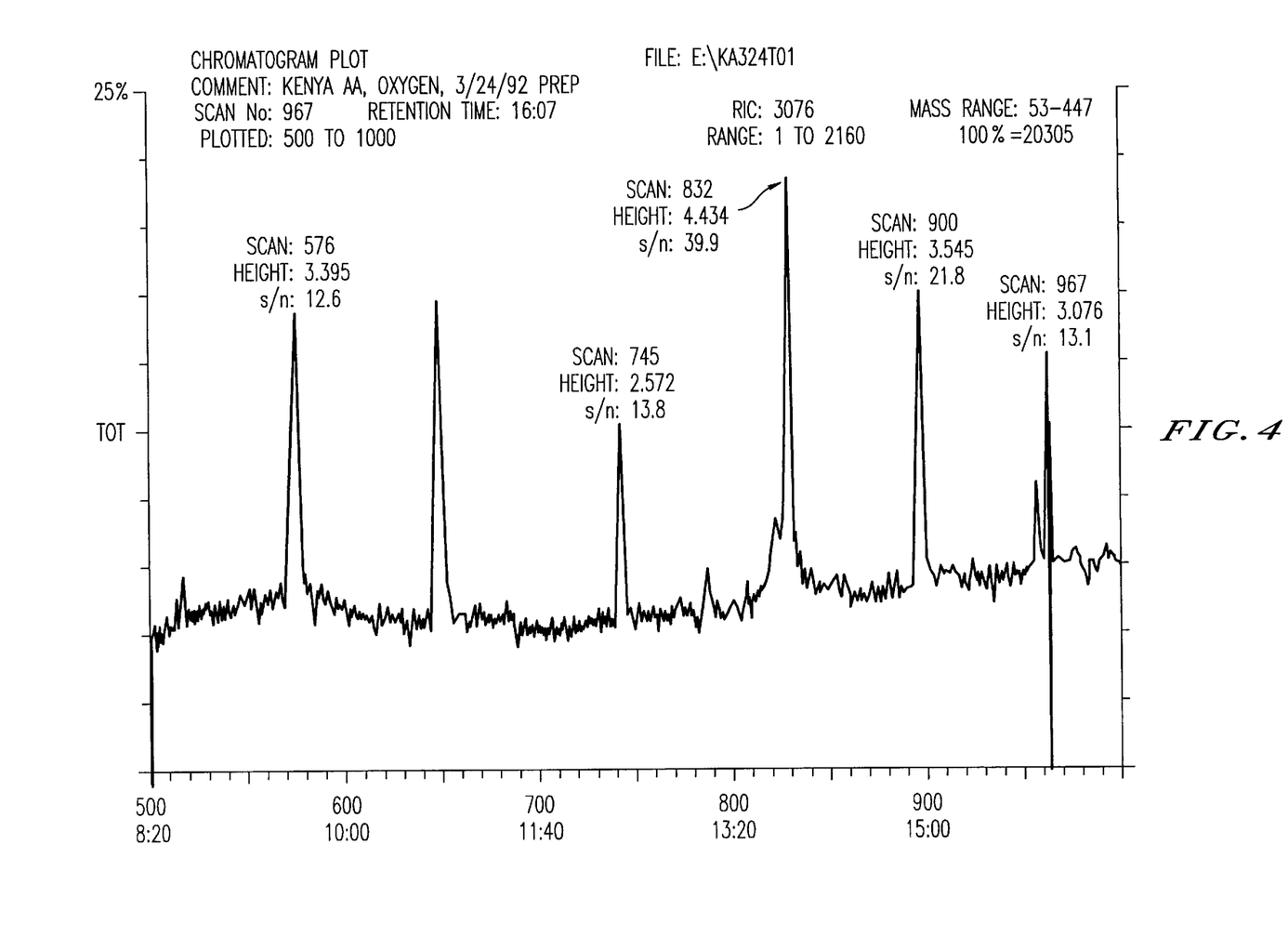
FIG. 4 illustrates GC/MS of Kenya AA aroma constituents. The coffee was fresh ground under nitrogen and packaged under oxygen.
Figure 5:
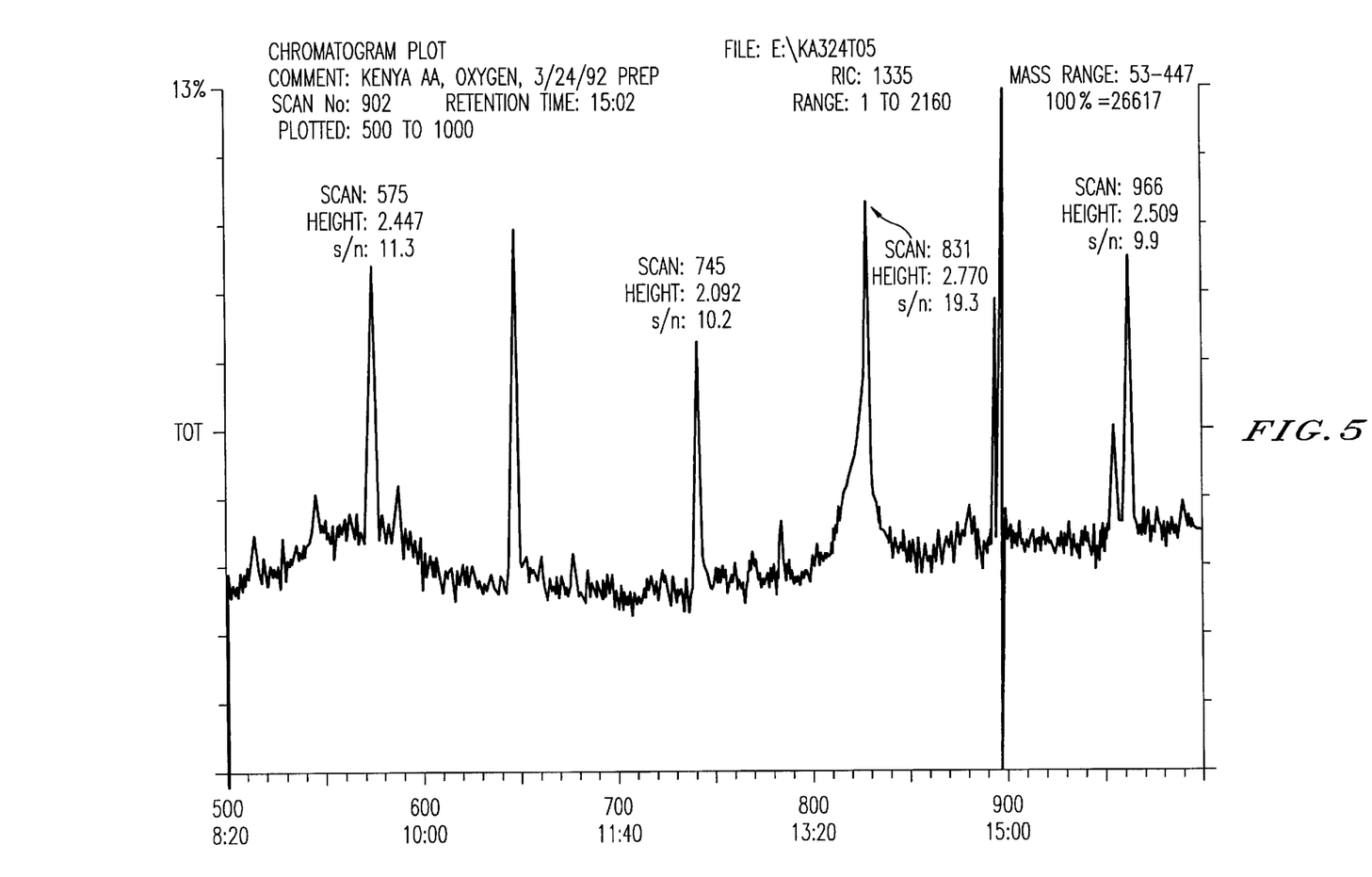
FIG. 5 illustrates Kenya AA packaged under nitrogen.
Figure 6:
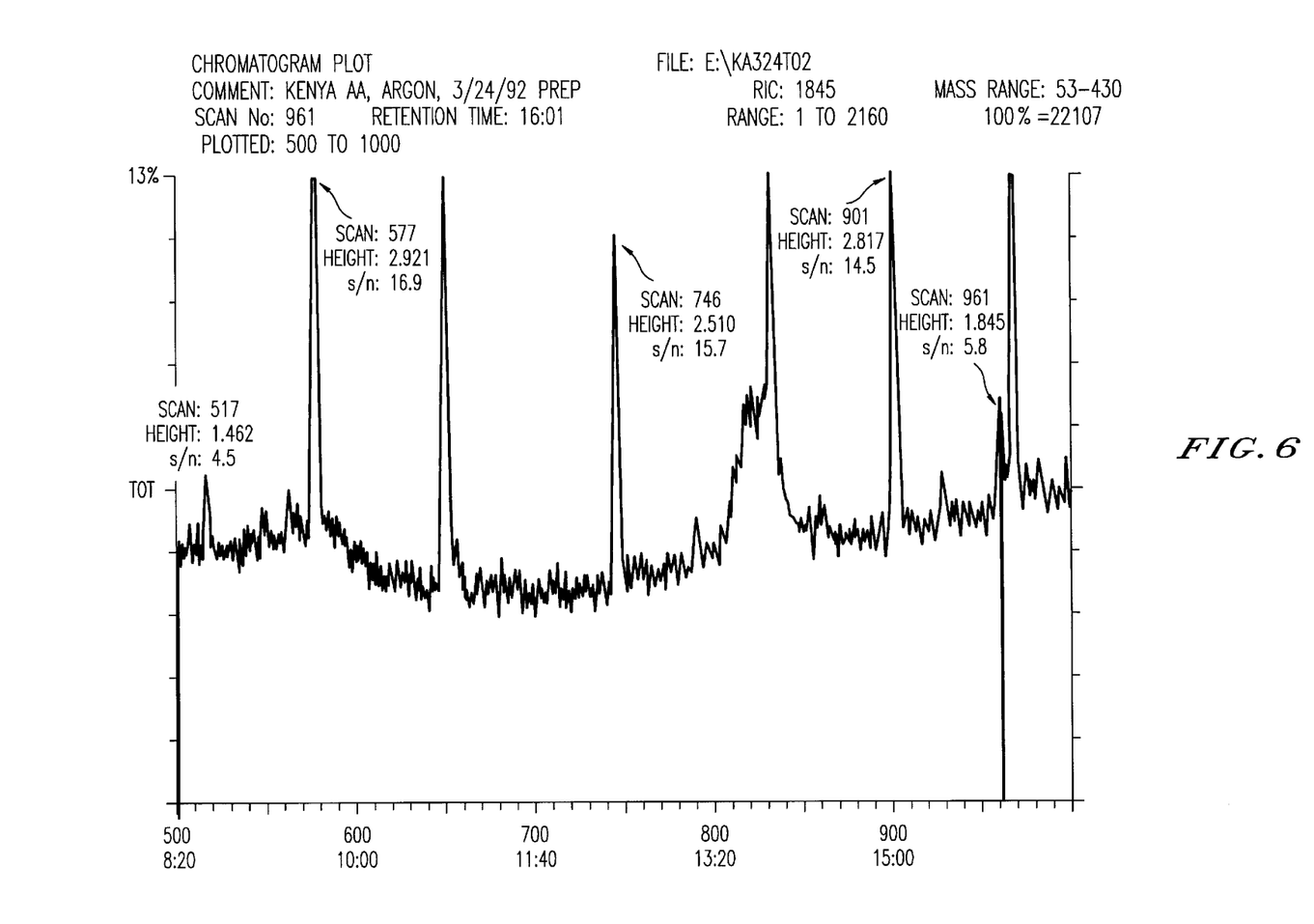
FIG. 6 illustrates Kenya AA packaged under argon.

To demonstrate the effect of the present invention, FIGS. 1–6 illustrate the assemblage of peaks between 750 and 832 seconds shows significant differential oxidation depending upon which gas is used to package the coffee. In Mocha Java the peak at 829–832 remains relatively constant in area while the peaks preceding between 750 and said peak are completely oxidized and disappear under oxygen, are significantly oxidized under nitrogen, and are extremely well preserved under xenon (or argon, krypton, or neon, or mixtures of noble gases). For Kenya AA, precisely the same effect is noted. Here argon is shown rather than xenon.

Generally, for FIGS. 1–6, nitrogen grinding of coffee was used. However, in using the present invention, the grinding may take place under carbon dioxide or air, although it is preferable to grind the coffee under the gases and gas mixtures of the present invention.

Notably, the various stages of coffee processing and storage may each or all be practiced in conjunction with the present invention. Further, it is explicitly noted that vacuum techniques may also be used and that different gases and gas mixtures may be used for different stages of processing and storage. Moreover, the advantages of the present invention are obtained when applied even to a portion of the coffee processing process.

Lastly, as used herein, it is understood that the term "processing" refers to any single step or multiple series of steps which are used for the preparation of coffee.

Blind taste-testing of the coffees confirmed an impression of staleness which corresponded fully with progressive oxidation as measured above, and of superior flavor and aroma in the noble-gas packaged coffees as compared to those packaged in nitrogen.

Tables I and II hereunder exemplify, respectively, the effect of different gas storage atmospheres (Table I) and the effect of gas mixtures in different proportions (Table II) on a ground coffee which has been saturated about 100% with the various mixtures shown in the Tables.

TABLE I

Coffee Evaluation
Effect of different gas storage atmosphere
After One Year

| Gas Mixes | Flavor Aroma | Shelf Life (degree of Oxidation) |
|---|---|---|
| $N_2$ | 40 | 40 |
| Ar | 96 | 94 |
| Ar:Kr 9:1 | 97 | 95 |
| Ar:Ne 9:1 | 96 | 94 |
| Ar:Xe 9:1 | 99 | 99 |
| Ar:Xe 99:1 | 100 | 100 |
| He | 50 | 50 |
| Ne | 80 | 75 |
| Kr | 96 | 93 |
| Xe | 100 | 100 |
| Air | 0 | 0 |
| $O_2$ | 0 | 0 |
| $N_2:O_2$ 9:1 | 20 | 20 |
| $Ar:O_2$ 9:1 | 88 | 75 |
| $CO_2$ | 50 | 50 |
| $N_2:CO_2$ 8:2 | 50 | 50 |
| $Ar:CO_2$ 8:2 | 70 | 70 |

Relative scaling of effect compared to

In the comparison of nitrogen vs. argon, it is clear that argon offers superior control of oxidation and preserves the product better. Xenon and krypton offer greater effect than argon, whereas neon may, and helium does not work. Mixtures of noble gases even at very low levels as exemplified with AR:Xe 99:1 give better results than argon alone. In the comparison of oxygen and air with $Ar+O_2$ and $N_2$, it is clear that argon offers preservative effect even in the presence of oxygen or carbon dioxide whereas nitrogen does not.

TABLE II

Coffee
Gas Mixtures in decile combination trials,
as: (After One Year)

| Gas Mixtures | Flavor Aroma | Shelf Life (degree of Oxidation) |
|---|---|---|
| Ar:Kr | | |
| 100:0 | 96 | 94 |
| 80:20 | 97 | 96 |
| 60:40 | 98 | 96 |
| 50:50 | 98 | 97 |
| Ar:Kr:Xe | | |
| 80:10:10 | 100 | 100 |
| 60:20:20 | 100 | 100 |
| 60:30:10 | 100 | 100 |
| Ar:$N_2$ | | |
| 100:0 | 96 | 94 |
| 80:20 | 90 | 98 |
| 50:50 | 70 | 75 |
| 20:80 | 50 | 50 |
| Ar:He | | |
| 100:0 | 96 | 94 |
| 80:20 | 92 | 90 |
| 50:50 | 75 | 70 |
| 20:80 | 50 | 50 |
| $N_2$:$O_2$ | | |
| 100:0 | 40 | 40 |
| 90:10 | 20 | 20 |
| 80:20 | 0 | 0 |
| 70:30 | 0 | 0 |
| Ar:$O_2$ | | |
| 100:0 | 96 | 94 |
| 90:10 | 88 | 75 |
| 80:20 | 60 | 50 |
| 70:30 | 20 | 30 |
| He:$O_2$ | | |
| 100:0 | 40 | 40 |
| 90:10 | 20 | 20 |
| 80:20 | 0 | 0 |
| 70:30 | 0 | 0 |

Relative scaling of effect compared to

In the above two tables, flavor and aroma by GC/MS method and shelf life by GC/MS method and calculation of the relative progress of oxidation over time compared with air or oxygen or nitrogen storage.

An organoleptic/sensory panel of five person have tested through blind samples the flavor and aroma which confirm the above sophisticated measurements.

Generally, the present invention may be applied to unground beans, beans in various stages of roasting, during grinding and thereafter. It may be applied to coffees from anywhere in the world, but is, if course, most advantageously used with the most aromatic.

Finally, it is, again, noted that the present invention may otherwise be practiced with equipment and methodologies known to those in the art.

Having described the present invention, it will now be apparent to one of ordinary skill in the art that many changes and modifications may be made to the above-described embodiments without departing from the spirit and scope of the present invention.

What is claimed is:

1. A method of improving the aroma or flavor or both of coffee, which comprises the steps of:
   a) sparging an effective amount of an atmosphere into the coffee in a closed space, the atmosphere consisting essentially of:
      i) 90 to 99% by volume of argon; and
      ii) 1 to 10% by volume of xenon, or krypton or both; and
   b) saturating the coffee with the atmosphere to more than 50% volume saturation; and maintaining the saturation throughout the coffee.

2. The method of claim 1, wherein said coffee is saturated with the atmosphere to more than 70% by volume.

3. The method of claim 2, wherein said coffee is saturated with the atmosphere to 80% or more by volume.

4. The method of claim 1, wherein said sparging is effecting using said atmosphere in gaseous form or liquid form or both.

5. The method of claim 1, wherein said coffee is step a) is ground coffee.

6. The method of claim 1, which is effected at a temperature of between 20° C. and 40° C.

7. The method of claim 1, wherein said sparging is effected at a pressure such that the pressure of the atmosphere above the coffee thereafter in the closed space is from between 1 and 2 atmospheres.

8. The method of claim 1, wherein said saturation is measured by gas chromatography/mass spectrometry.

9. A method of improving the aroma or flavor or both of coffee, which comprises the steps of:
   a) sparging an effective amount of an atmosphere into the coffee in a closed space, the atmosphere consisting essentially of:
      i) 50 to 80% by volume of argon; and
      ii) 50 to 20% by volume of krypton; and
   b) saturating the coffee with the atmosphere to more than 50% volume saturation; and maintaining the saturation throughout the coffee.

10. The method of claim 9, wherein said coffee is saturated with the atmosphere to more than 70% by volume.

11. The method of claim 10, wherein said coffee is saturated with the atmosphere to 80% or more by volume.

12. The method of claim 9, wherein said sparging is effected using said atmosphere in gaseous form or liquid form or both.

13. The method of claim 9, wherein said coffee is step a) is ground coffee.

14. The method of claim 9, which is effected at a temperature of between 20° C. and 40° C.

15. The method of claim 9, wherein said sparging is effected at a pressure such that the pressure of the atmosphere above the coffee in the closed space is from between 1 and 2 atmospheres.

16. The method of claim 9, wherein said saturation is measured by gas chromatography/mass spectrometry.

17. A method of processing coffee to provide improved aroma or flavor or both therefor, which comprises the steps of:
   a) roasting coffee or beans therefor under an effective amount of an atmosphere consisting essentially of:
      i) 90 to 99% by volume of argon; and
      ii) 1 to 100% by volume of xenon, or krypton, or both;
   b) sparging an effective amount of said atmosphere into the roasted coffee or beans therefor in a closed space; and
   c) saturating the coffee or beans thereof with said atmosphere to more than 50% volume saturation; and maintaining the saturation throughout the coffee or beans thereof.

18. The method of claim 17, wherein said coffee is saturated with the atmosphere to more than 70% by volume.

19. The method of claim 18, wherein said coffee is saturated with the atmosphere to 80% or more by volume.

20. The method of claim 17, wherein said sparging is effected using said atmosphere in gaseous form or liquid form or both.

21. The method of claim 17, wherein said coffee is step a) is ground coffee.

22. The method of claim 17, which is effected at a temperature of between 20° C. and 40° C.

23. The method of claim 17, wherein said sparging is effected at a pressure such that the pressure of the atmosphere above the coffee in the closed space is from between 1 and 2 atmospheres.

24. The method of claim 17, wherein said saturation is measured by gas chromatography/mass spectrometry.

25. A method of processing coffee to provide improved aroma or flavor or both therefor, which comprises the steps of:
   a) roasting coffee beans under an atmosphere consisting essentially of:
      i) 90 to 99% by volume of argon; and
      ii) 1 to 100% by volume of xenon, or krypton, or both;
   b) stoning said beans, thereby separating said beans from heavier contaminants thereof;
   c) grinding said beans, thereby producing ground coffee; and
   d) packaging said ground coffee.

26. The method of claim 25, which further comprises conducting step b) under an atmosphere having the same composition as that of step a).

27. The method of claim 26, which further comprises conducting step c) under an atmosphere having the same composition as that of step a).

28. The method of claim 27, which further comprises conducting step d) under an atmosphere having the same composition as that of step a), whereby all of said steps a), b) c) and d) are under said atmosphere.

29. The method of claim 25, wherein said roasting step a) is effected by batch.

30. The method of claim 25, wherein said roasting step a) is effected continuously.

31. The method of claim 25, wherein said stoning step b) is effected by air-lifts.

32. The method of claim 25, wherein said grinding step c) is effected by a plate, compactor or granulator grinder.

33. The method of claim 25, which further comprises between steps c) and d), a step of freeze-drying said ground coffee under an atmosphere having the same composition as that of step a).

34. The method of claim 25, wherein said saturation is measured by gas chromatography/mass spectrometry.

35. A method of processing coffee to provide improved aroma or flavor or both, which comprises the steps of:
   a) evacuating a closed space containing coffee or beans thereof, thereby removing air therefrom;
   b) sparging said coffee or beans thereof in said closed space with an effective amount of an atmosphere consisting essentially of:
      i) 90 to 99% by volume of argon; and
      ii) 1 to 10% by volume of xenon, or krypton or both; and
   c) saturating the coffee or beans thereof with said atmosphere to more than 50% volume saturation; and maintaining the saturation throughout the coffee or beans thereof.

36. The method of claim 35, which further comprises after step b), a step of packaging said coffee or beans thereof.

37. A method of improving the aroma or flavor or both of coffee, which comprises the steps of:
   a) sparging an effective amount of an atmosphere into the coffee in a closed space, the atmosphere consisting essentially of:
      i) 60 to 80% by volume of argon;
      ii) 30 to 10% by volume of krypton; and
      iii) 20 to 10% by volume of xenon; and
   b) saturating said coffee with said atmosphere to more than 50% volume saturation; and maintaining said saturation throughout said coffee.

38. A method of improving the aroma or flavor or both of coffee, which comprises the steps of:
   a) sparging an effective amount of an atmosphere into the coffee in a closed space, the atmosphere consisting essentially of:
      i) a carrier gas selected from the group consisting of nitrogen, oxygen, nitrous oxide, air, helium and carbon dioxide; and
      ii) 90 to 99% by volume of argon, and 1 to 10% by volume of krypton or xenon or both; and
   b) saturating the coffee with the atmosphere to more than 50% volume saturation; and maintaining the saturation throughout the coffee.

39. A method of improving the aroma or flavor or both of coffee, which comprises the steps of:
   a) sparging an effective amount of an atmosphere into the coffee in a closed space, the atmosphere consisting essentially of:
      i) a carrier gas selected from the group consisting of nitrogen, oxygen, nitrous oxide, air, helium, and carbon dioxide; and
      ii) 50 to 80% by volume of argon, and 50, to 20% by volume of krypton; and
   b) saturating the coffee with the atmosphere to more than 50% volume saturation; and maintaining the saturation throughout the coffee.

40. A method of processing coffee to provide improved aroma or flavor or both therefor, which comprises the steps of:
   a) roasting coffee or beans therefor under an effective amount of an atmosphere consisting essentially of:
      i) a carrier gas selected from the group consisting of nitrogen, oxygen, nitrous oxide, air, helium and carbon dioxide; and
      ii) 90 to 99% by volume of argon, and 1 to 100% by volume of xenon or krypton or both; and
   b) sparging an effective amount of said atmosphere into the roasted coffee or beans therefor in a closed space; and
   c) saturating the coffee or beans thereof with said atmosphere to more than 50% volume saturation; and maintaining the saturation throughout the coffee or beans thereof.

* * * * *